Feb. 8, 1955  E. A. BELMONT  2,701,605
LEG REST
Filed Sept. 24, 1953
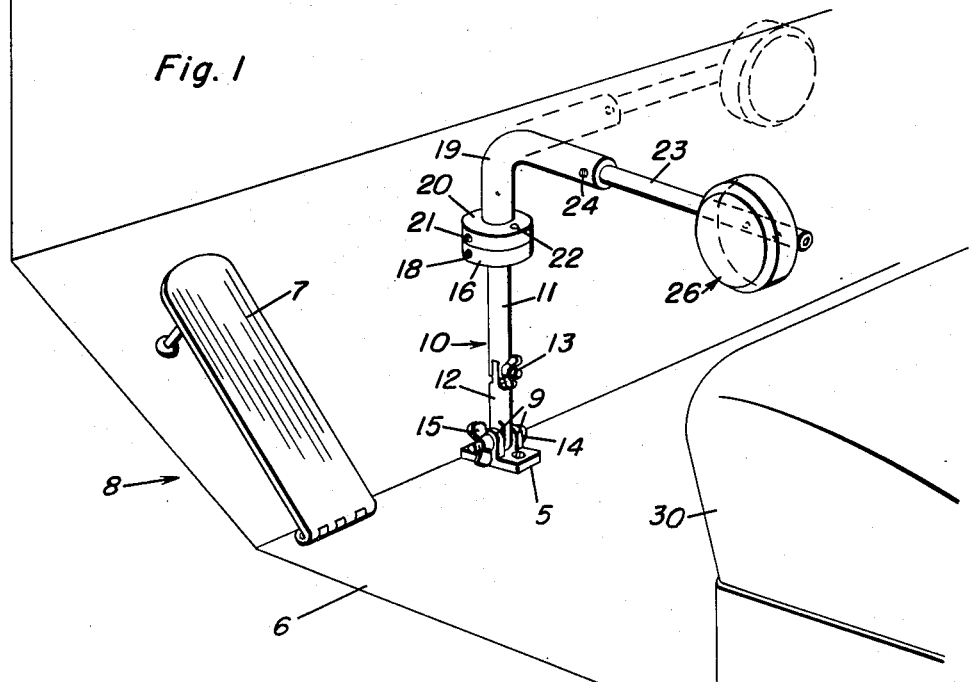
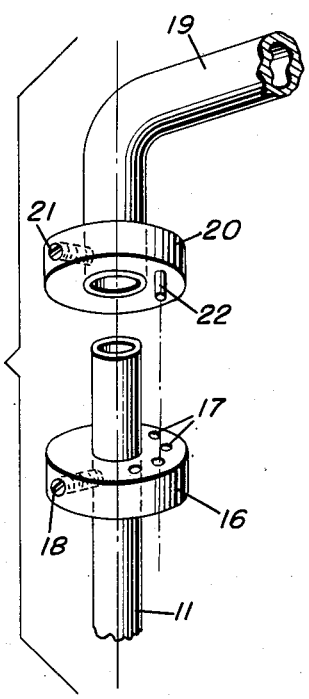
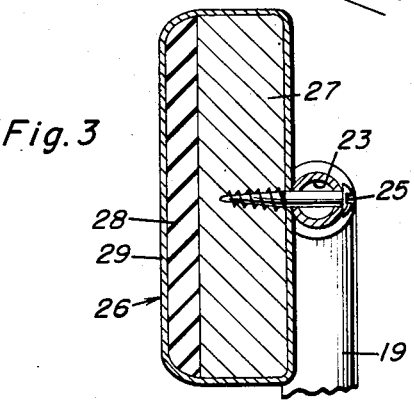
Edward A. Belmont
INVENTOR.
BY *Clarence A. O'Brien*
*and Harvey B. Jackson*
Attorneys United States Patent Office 2,701,605
Patented Feb. 8, 1955

2,701,605
LEG REST

Edward A. Belmont, Granada Hills, Calif.

Application September 24, 1953, Serial No. 382,151

1 Claim. (Cl. 155—165)

The present invention relates to new and useful improvements in rests particularly for the accelerator legs of the drivers of automobiles, trucks, etc., and has for its primary object to provide, in a manner as hereinafter set forth, a device of this character which is universally adjustable for various types of motor vehicles and to accommodate different operators.

Another very important object of the invention is to provide a leg rest of the aforementioned character which may be expeditiously swung to and secured in an out-of-the-way position when not in use.

Other objects of the invention are to provide a leg rest of the aforementioned character which will be comparatively simple in construction, strong, durable, highly efficient and reliable in use, compact, and which may be manufactured and installed at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view, showing a leg rest embodying the present invention installed for use;

Figure 2 is a perspective view of the intermediate portion of the device, showing the parts separated;

Figure 3 is a vertical sectional view through the pad.

Referring now to the drawing in detail, it will be seen that the embodiment of the invention which has been illustrated comprises a metallic base 5 which is apertured to accommodate screws for securing said base in position on the floor board 6 adjacent the usual accelerator pedal 7 of a motor vehicle 8. The base or bracket 5 includes upstanding apertured ears 9.

Mounted for swinging movement on the base or bracket 5 is a post 10 of suitable metal. The post 10 comprises upper and lower sections 11 and 12 respectively, which are hingedly connected as at 13. The lower section 12 of the post 10 is mounted for swinging adjustment on a bolt 14 between the ears 9, a wing nut 15 being threaded on said bolt for securing the adjustment. It will be observed that the section 12 of the post 10 is mounted to swing longitudinally on the base 5 relative to the vehicle 8 and that the upper section 11 is mounted for lateral swinging adjustment on said lower section 12.

Adjustably mounted on the upper portion of the post section 11 is a collar 16 having spaced openings 17 therein. A set screw 18 secures the collar 16 in adjusted position. Telescopically and rotatably mounted on the post section 11 above the collar 16 and resting thereon is an elbow 19 of suitable metal. A collar 20 is secured by a set screw 21 on the lower end portion of the elbow 19 and rests on the collar 16. A pin or detent 22 depends from the collar 20 and is engageable selectively in the openings 17 for securing said elbow in rotatably adjusted position on the post 10.

Telescopically mounted for rotary and sliding adjustment in the horizontal leg of the elbow 19 is a tubular arm 23. A set screw 24 secures the arm 23 in adjusted position. Secured by screws 25 on the outer or free end portion of the arm 23 is a substantially flat, circular pad 26. The pad 26, in the embodiment shown, includes a disc 27 of suitable material, a cushion 28 and a cover 29.

It is thought that the operation of the invention will be readily apparent from a consideration of the foregoing. Briefly, the operator of the vehicle 8 sits on the seat 30 with the right foot engaged with the accelerator 7 in the usual manner. Thus, the pad 26 of the rest is in a position to receive and laterally support the leg in a manner to prevent fatigue and promote comfort during long drives. It will be observed that adjustments may be readily made at the base or bracket 5, at the hinge connection 13, at the joint between the elbow 19 and the post section 11, and between the elements 19 and 23. As suggested in broken lines in Figure 1 of the drawing, when the rest is not in use the pad 26 may be expeditiously swung to an out-of-the-way position by disengaging the detent 22 from the respective opening 17, swinging the elbow 19 on the post 10 and then permitting said detent to enter another of the openings 17.

It is believed that the many advantages of a leg rest constructed in accordance with the present invention will be readily understood and although a preferred embodiment of the device is as illustrated and described, it is to be understood that changes in the details of construction may be resorted to which will fall within the scope of the invention as claimed.

What is claimed is:

A leg rest of the character described comprising a post, means for mounting said post on a support, a collar mounted for rotary and sliding adjustment on the post and having a series of vertical openings therein, a tubular elbow telescopically mounted for sliding and rotary adjustment on the post above the collar and resting by gravity thereon, a collar fixed on one end portion of said elbow and rotatable on the first named collar, a depending detent on the second named collar engageable selectively in the openings for securing the elbow in rotatably adjusted position on the post, an arm telescopically mounted for sliding and rotary adjustment in the other end portion of the elbow, and a pad fixed on said arm.

References Cited in the file of this patent

UNITED STATES PATENTS

| Number | Name | Date |
|---|---|---|
| 1,567,285 | Mitchell | Dec. 29, 1925 |
| 1,986,555 | Carlson | Jan. 1, 1935 |
| 2,229,789 | Arndt | Jan. 28, 1941 |
| 2,473,947 | Hamstrom | June 21, 1949 |